US012332995B2

(12) United States Patent
Scrivano et al.

(10) Patent No.: US 12,332,995 B2
(45) Date of Patent: Jun. 17, 2025

(54) CONTAINERS SYSTEM AUDITING THROUGH SYSTEM CALL EMULATION

(71) Applicant: Red Hat, Inc., Raleigh, NC (US)

(72) Inventors: Giuseppe Scrivano, Milan (IT); Daniel Walsh, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 603 days.

(21) Appl. No.: 17/079,200

(22) Filed: Oct. 23, 2020

(65) Prior Publication Data

US 2022/0129541 A1  Apr. 28, 2022

(51) Int. Cl.
*G06F 9/46* (2006.01)
*G06F 9/455* (2018.01)
(Continued)

(52) U.S. Cl.
CPC .......... *G06F 21/53* (2013.01); *G06F 9/45558* (2013.01); *G06F 9/545* (2013.01); *G06F 21/562* (2013.01); *G06F 21/566* (2013.01); *G06F 2009/45587* (2013.01); *G06F 2009/45591* (2013.01); *G06F 2221/034* (2013.01)

(58) Field of Classification Search
CPC ............... G06F 9/45558; G06F 9/545; G06F 2009/45587; G06F 2009/45591; G06F 2009/45579; G06F 2009/45583; G06F 21/53; G06F 21/562; G06F 21/566; G06F 2221/034
See application file for complete search history.

(56) References Cited

U.S. PATENT DOCUMENTS 5,828,855 A * 10/1998 Walker ...................... H04L 9/40
709/227
8,028,071 B1 * 9/2011 Mahalingam ........... H04L 69/32
718/1
(Continued)

FOREIGN PATENT DOCUMENTS

| AU | 2005202842 A1 * | 1/2006 |
| CN | 101551756 B * | 2/2012 |
| WO | 2019127399 | 7/2019 |

OTHER PUBLICATIONS

Brockmeier, Secure Your Containers with this One Weird Trick, Oct. 17, 2016, Red Hat, pp. 1-8 (Year: 2016).*
(Continued)

*Primary Examiner* — April Y Blair
*Assistant Examiner* — Zhi Chen
(74) *Attorney, Agent, or Firm* — Womble Bond Dickinson (US) LLP (57) ABSTRACT

Embodiments of the present disclosure provide a substitute audit log for use by applications in the user-space of a host operating system to write audit information. When a container makes a system call attempting to write audit information to an audit log of the kernel, the kernel may utilize a predefined set of instructions indicating how to detect such system calls and how such system calls are to be modified so as to reroute the system call to an unprivileged socket. The kernel write the audit information of the system call to an unprivileged socket that is connected to a substitute audit log. A container management program monitoring the unprivileged socket may write the audit information to the substitute log which is defined in container specific directories of the container.

17 Claims, 7 Drawing Sheets

(51) Int. Cl.
*G06F 9/54* (2006.01)
*G06F 21/53* (2013.01)
*G06F 21/56* (2013.01)

(56) References Cited

U.S. PATENT DOCUMENTS

| | | | | |
|---|---|---|---|---|
| 8,169,904 | B1* | 5/2012 | Breau | H04L 65/80 370/231 |
| 8,631,464 | B2* | 1/2014 | Belakhdar | G06F 21/316 726/22 |
| 10,650,138 | B2 | 5/2020 | D'Errico et al. | |
| 11,481,487 | B2* | 10/2022 | Halcrow | G06F 21/53 |
| 2003/0204593 | A1* | 10/2003 | Brown | H04L 41/0816 709/224 |
| 2006/0123416 | A1* | 6/2006 | Cibrario Bertolotti | G06F 9/45533 718/1 |
| 2010/0027443 | A1* | 2/2010 | LoGalbo | H04L 12/189 370/254 |
| 2013/0024684 | A1* | 1/2013 | Chunduri | H04L 63/166 713/151 |
| 2013/0215213 | A1* | 8/2013 | Power | H04L 65/611 348/14.02 |
| 2015/0156183 | A1* | 6/2015 | Beyer | H04L 63/145 726/4 |
| 2015/0371053 | A1* | 12/2015 | Welch | G06F 21/6227 726/30 |
| 2016/0285753 | A1* | 9/2016 | Guleria | H04L 45/38 |
| 2017/0048328 | A1* | 2/2017 | Korotaev | H04L 67/56 |
| 2017/0054770 | A1* | 2/2017 | Wells | H04L 65/65 |
| 2017/0142144 | A1* | 5/2017 | Weinberger | H04L 63/1408 |
| 2017/0344292 | A1* | 11/2017 | Sterin | G06F 3/0605 |
| 2019/0028490 | A1* | 1/2019 | Chen | H04L 63/1416 |
| 2019/0250835 | A1* | 8/2019 | Piccinini | G06F 21/78 |
| 2019/0294779 | A1 | 9/2019 | Suneja et al. | |
| 2020/0012511 | A1* | 1/2020 | Ganesh | G06F 9/44526 |
| 2021/0034279 | A1* | 2/2021 | Mishina | G06F 3/0605 |
| 2021/0067553 | A1* | 3/2021 | Ries | H04L 63/08 |
| 2021/0182078 | A1* | 6/2021 | Rietschin | G06F 16/162 |
| 2022/0012110 | A1* | 1/2022 | Dhillon | G06F 9/547 |

OTHER PUBLICATIONS

Kerrisk, capabilities(7)—Linux manual page, Oct. 19, 2020, man7.org, pp. 1-23 (Year: 2020).*
Red Hat Enterprise Linux Atomic Host 7 Container Security Guide, Aug. 6, 2020, Red Hat, pp. 1-19 (Year: 2020).*
Seccompsandbox—overview.wiki, Sep. 5, 2020, google.com, pp. 1-4 (Year: 2020).*
Gordon "Fyodor" Lyon, Miscellaneous Options, Oct. 20, 2020, nmap.org (Year: 2020).*
Grattafiori, "Understanding and Hardening Linux Containers", Technical Director, NCC Group Whitepaper, Jun. 29, 2016, https://www.nccgroup.com/globalassets/our-research/us/whitepapers/2016/april/ncc_group_understanding_hardening_linux_containers-1-1.pdf.
Jahoda, et al., "Security Guide", Red Hat Customer Content Services, 2020, https://access.redhat.com/documentation/en-us/red_hat_enterprise_linux/6/html-single/security_guide/index.
Rothberg, "Improving Linux container security with seccomp", Red Hat Inc., Jun. 15, 2020, https://www.redhat.com/sysadmin/container-security-seccomp.
"Ubunto Core—Security", Canonical Ubuntu Engineering and Services, Nov. 1, 2018, https://assets.ubuntu.com/v1/66fcd858-canonical-ubuntu-core-security-2018-11-13.pdf.

* cited by examiner

CONTAINERS SYSTEM AUDITING THROUGH SYSTEM CALL EMULATION

TECHNICAL FIELD

Aspects of the present disclosure relate to containers, and more particularly, to recording information from a container that is intended for an audit log.

BACKGROUND

Containers are active components executing on an operating system that provide an environment for applications to run, while being isolated from any other components of a host machine, network, or data center etc. Multiple containers may execute on a single operating system kernel and share the resources of the hardware the operating system is running on. All of the files, libraries and dependencies necessary to run applications in a container may be provided by an image file(s). An image file may be comprised of a set of base layers that define the runtime environment, as well as the packages and utilities necessary for a containerized application to run. A container may include the base layers from an image file as well as an in-memory layer in which the containerized application may write/modify data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

The Linux audit system provides a way to track security-relevant information on a system based on pre-configured rules. The Linux audit system includes an audit log in which log files are generated to record as much information about security-relevant events that are happening on the system as possible. This information may be crucial for mission-critical environments to detect violators of a security policy and the actions they performed. It should be noted that the Linux audit system does not provide additional security but is used to discover violations of security policies used on the system (e.g., the host operating system (OS)).

The Linux audit system may track various types of information in its log files including for example the date and time, type, and outcome of an event, sensitivity labels of subjects and objects, association of an event with the identity of the user who triggered the event, all modifications to audit configuration and attempts to access audit log files, and all uses of authentication mechanisms, such as ssh and kerberos. Privileged applications (e.g., sshd) communicate with the kernel through a netfilter socket to report any security related activity happening on the system such as logins, or changes of ID.

Containers are initialized with a default set of privileges, and privileges in the default set can be manually removed or added. Among these default privileges is the audit_write capability, which allows an application running in a container to write records to the audit log of the Linux audit system. However, because audit_write is a privileged operation, there are inherent dangers with allowing an application in a container (e.g., user-space) to use it. The security events happening inside the container are interleaved with security events happening on the host OS. In addition, it is not always possible to trust the application/process that is running in the container, as the application in the container could write anything into the audit log, including information that could compromise the trust relationship between the processes on the host OS and what is in the audit log. As a result of this, security of the host OS may be enhanced by limiting the use of audit_write to system applications (e.g., those on the host OS), as opposed to allowing containers to use it. If the audit_write capability is restricted, then an application attempting to access the Linux audit system would see all requests refused with e.g., an operation not permitted response. This result is undesirable because user-space applications often have important information that needs to be recorded and analyzed.

The present disclosure addresses the above-noted and other deficiencies by using a processing device to provide a substitute audit log for use by applications in the user-space of a host OS to write audit information. The processing device may detect a system call from a container that is attempting to write information to an audit log of the kernel. This detection may be done by determining if the arguments of the system call require a privileged socket to be initiated for communication with the kernel. The kernel may have a predefined set of instructions indicating how to detect such system calls and how such system calls are to be modified so as to reroute the system call to an unprivileged socket. Upon detecting the system call, the kernel may intercept the system call and modify it based on the set of instructions, as well as write the information of the system call to the unprivileged socket once the system call has been connected to it. A container management program may monitor the unprivileged socket, and in response to detecting that information has been written to the unprivileged socket, may write the information to a substitute log defined in container specific directories of the container.

Figure 1:
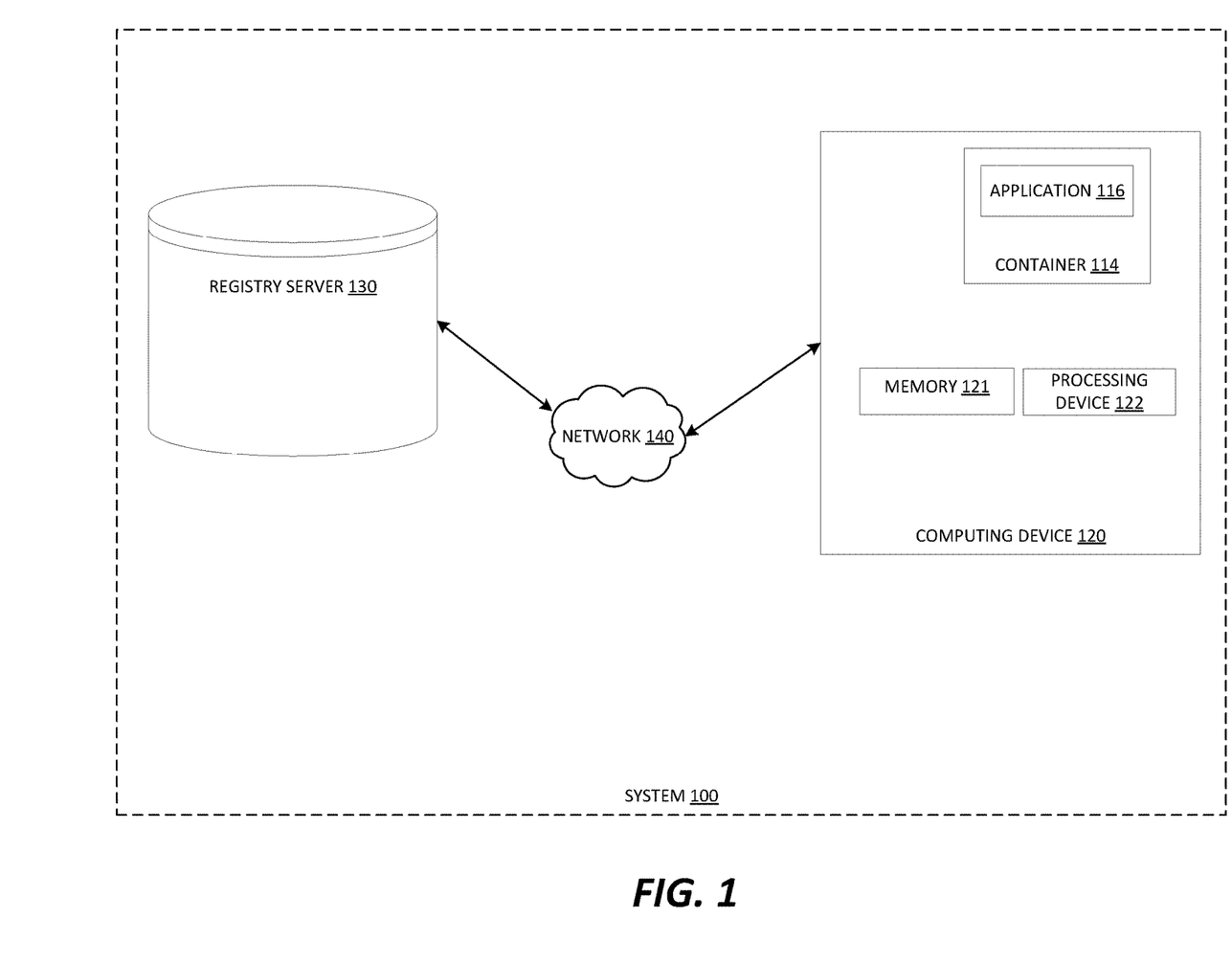
FIG. 1 is a block diagram that illustrates an example system, in accordance with some embodiments of the present disclosure.

FIG. 1 is a block diagram that illustrates an example system 100. As illustrated in FIG. 1, the system 100 includes a computing device 120, a registry server 130 and a network 140. The computing device 120 and the registry server 130 may be coupled to each other (e.g., may be operatively coupled, communicatively coupled, may communicate data/ messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. The network 140 may carry communications (e.g., data, message, packets, frames, etc.) between computing device 120 and registry server 130. The computing device 120 (and registry server 130) may include hardware such as processing device 122 (e.g., processors, central processing units (CPUs)), memory 121 (e.g., random access memory (RAM), storage devices (e.g., hard-disk drive (HDD)), and solid-state drives (SSD), etc.), and other hardware devices (e.g., sound card, video card, etc.). A storage device may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

FIG. 1 and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

The computing device 120 and registry server 130 may each comprise any suitable type of computing device or machine that has a programmable processor including, for example, server computers, desktop computers, laptop computers, tablet computers, smartphones, set-top boxes, etc. In some examples, the computing device 120 and registry server 130 may comprise a single machine or may include multiple interconnected machines (e.g., multiple servers configured in a cluster). The computing device 120 and registry server 130 may be implemented by a common entity/organization or may be implemented by different entities/organizations. For example, computing device 120 may be operated by a first company/corporation and registry server 130 may be operated by a second company/corporation. The computing device 120 and registry server 130 may each execute or include an operating system (OS), as discussed in more detail below. The OSs of computing device 120 and registry server 130 may manage the execution of other components (e.g., software, applications, etc.) and/or may manage access to the hardware (e.g., processors, memory, storage devices etc.) of the computing device.

As illustrated in FIG. 1, computing device 120 may run a container 114. In some embodiments, the container 114 may execute on a container engine (shown in FIG. 2) which executes on top of the host OS 221 of computing device 120, as discussed in more detail below. The container engine may allow different containers to share the host OS 221 (e.g., the OS kernel, packages, binaries, libraries thereof etc.), and may also perform other functions as discussed in more detail below. The container 114 may be isolated, in that it is not connected to any other device or component of system 100, whether virtual or otherwise. Container 114 may execute application 116. Registry server 130 may be a server which may store image files (e.g., docker images), as discussed in further detail herein. Although FIG. 1 illustrates only a single computing device 120 for ease of illustration and description, computing device 120 may be just one deployment among many within an overarching cloud or on-premises infrastructure that system 100 represents. For example, additional computing devices may be included within system 100 that act as additional deployments.

Figure 2:
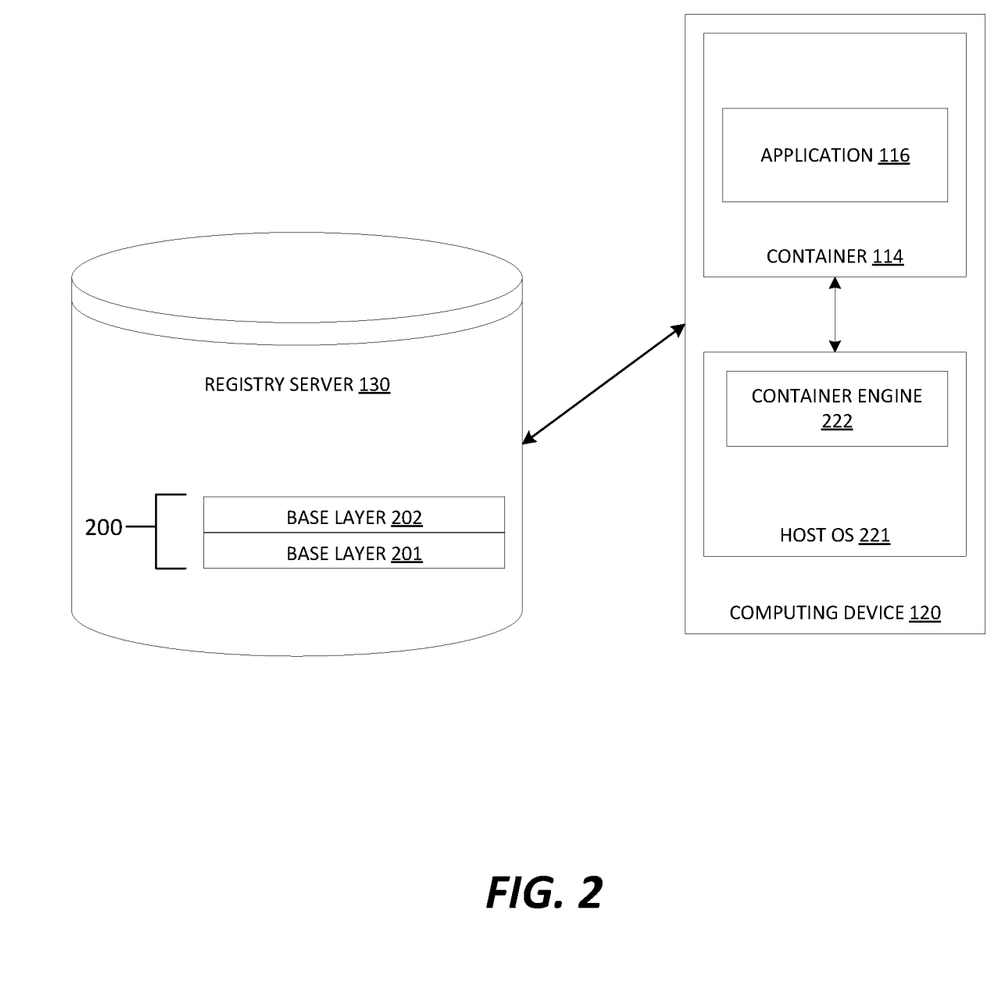
FIG. 2 is a block diagram that illustrates an example container executing within a computing device, in accordance with some embodiments of the present disclosure.

FIG. 2 is a block diagram that illustrates the container 114 of FIG. 1 executing within computing device 120, in accordance with some embodiments of the present disclosure. As discussed above, the container 114 may execute on computing device 120. In one embodiment, the container 114 may be an isolated set of resources allocated to executing an application, software, and/or process independent from other applications, software, and/or processes. The host OS 221 may use namespaces to isolate the resources of containers from each other. In another embodiment, the container 114 may be a virtualized object similar to a virtual machine. However, container 114 may not implement a separate guest OS. The container 114 may share the OS kernel and packages (e.g., libraries, binary files and source files) of the host OS 221 with other containers (not shown) that are executing on the computing device 120. Although FIG. 2A illustrates one container 114, the computing device 120 may include multiple containers in other embodiments. Each container may have one or more respective file systems, memories, devices, network ports, etc., for accessing the physical resources of the computing device 120 (e.g., processing device 122 and memory 121, shown in FIG. 1B).

In some embodiments, the container engine 222 may allow different containers to share the host OS 221 (including e.g., the OS kernel as well as packages including any associated libraries, binary and/or source files etc.) of the computing device 120. For example, the container engine 222 may multiplex the packages of the host OS 221 between multiple containers as discussed in further detail herein. The container engine 222 may also facilitate interactions between the container 114 and the resources of the computing device 120. For example, the container engine 222 may manage requests from container 114 to access a memory (e.g., a RAM) of the computing device 120. In another example, the container engine 222 may manage requests from the container 114 to access certain packages of the host OS 221. The container engine 222 may also create, remove, and manage containers. In one embodiment, the container engine 222 may be a component of the host operating system 221 (e.g., Red Hat™ Enterprise Linux). In another embodiment, container engine 222 may run on top of the host operating system 221, or may run directly on host hardware without the use of a host operating system 221. In yet other embodiments, container engine 222 may be a component of a network virtualization platform (not shown), such as the RedHat™ OpenStack™ platform for example, that runs on host OS 211. Container engine 222 may include software or logic to build a container using e.g., an existing image file or a docker file (to build an image file).

As illustrated in FIG. 2, application 116 may execute within the container 114. For example, the application 116 may execute within a runtime environment (not shown in the figures) of the container 114. Both the container 114 and the application 116 may be created by the host OS 221 (e.g., via container engine 222). The host OS 221, via the computing device 120 may provide administrators and users with the capability to configure and deploy a variety of applications and/or network functions within containers.

Container engine 222 may provide an image-based deployment module for creating containers and may store one or more image files for creating container instances. In some embodiments, the image files may be stored in registry server 130. Each image file may include a series of layers, which may be combined into a single image as discussed in further detail herein.

Container engine 222 may include a storage driver (not shown), such as OverlayFS, to manage the contents of a container including the read only (e.g., base) and writable (e.g. in-memory) layers of the container. The storage driver may be a type of union file system which allows a developer to overlay one layer on top of another. Changes (e.g., data to be written) may be recorded in the upper-most layer (e.g., the in-memory layer), while the lower layer(s) (e.g., base images) remain unmodified. In this way, multiple containers may share an image file that includes base layers that are read-only.

As further shown in FIG. 2, the registry server 130 may include an image file 200, which may include a number of base layers 201 and 202. When the container engine 222 creates a new container 114, it may add a new writable (e.g., in-memory) layer (not shown) on top of the underlying base layers. When the container is deleted, the in-memory layer is also deleted. However, the underlying image file 200 remains unchanged. Although illustrated as having two base layers for simplicity, image file 200 may include any suitable number of base layers. Base layers may define the runtime environment as well as the packages and utilities necessary for a containerized application to run. In the example of FIG. 2, base layer 201 may comprise the host OS 221 (including e.g., the OS kernel as well as the packages of the host OS 221 including any associated libraries, binary and/or source files etc.), on which the application 116 may run. The base layer 202 may comprise the application 116 itself including any packages and utilities necessary for the application 116 to run. Thus, base layers 201 and 202 may each comprise static snapshots of the container 114's configuration and may be read-only layers that are never modified. Any changes (e.g., data to be written by the application 116) may be implemented in subsequent (upper) layers such as the in-memory layer. Changes made in the in-memory layer may be saved by creating a new layered image.

Figure 3A:
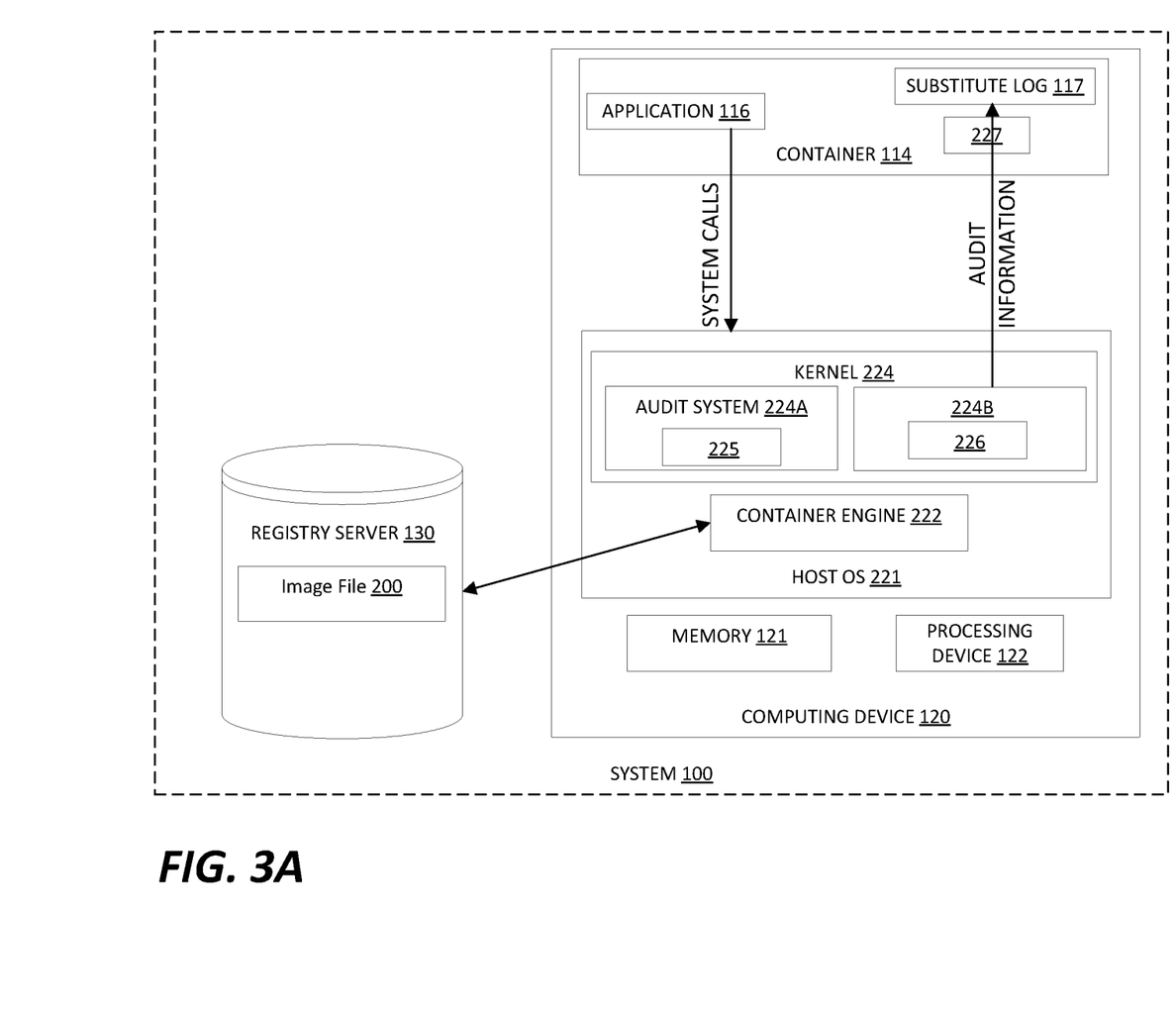
FIG. 3A is a block diagram that illustrates an example system, in accordance with some embodiments of the present disclosure.
Figure 3B:
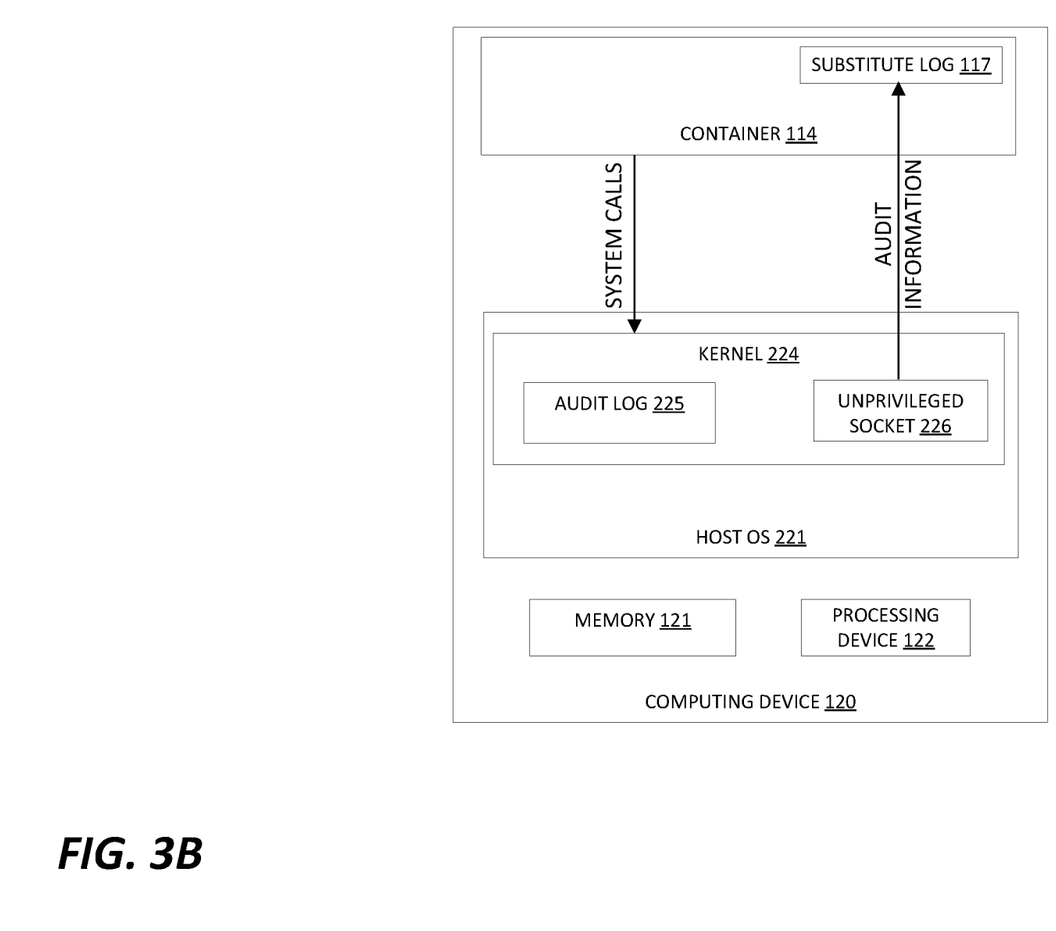
FIG. 3B is a block diagram that illustrates an example system, in accordance with some embodiments of the present disclosure.

FIGS. 3A and 3B illustrate the system 100 and computing device 120 in accordance with some embodiments of the present disclosure. As shown in FIG. 3A, the kernel 224 may include an audit system component 224A (hereinafter referred to as "audit system 224A"), which may represent the Linux audit system. The audit system 224A may provide a way to track security-relevant information on the host OS 221 based on pre-configured rules. The audit system 224A includes an audit log 225 in which log files are generated to record as much information about the events that are happening on the host OS 221 as possible. This information may be crucial for mission-critical environments to detect violators of a security policy and the actions they performed. It should be noted that the audit system 224A does not provide additional security but is used to discover violations of security policies used on the host OS 221. These violations can further be prevented by additional security measures such as SELinux. Although illustrated as a component of the kernel 224 in FIG. 3A, in some embodiments the audit system 224A may be logic/functionality integrated into the container engine 222 or firmware/logic within processing device 122.

The audit system 224A may track various types of information in its log files including for example the date and time, type, and outcome of an event, sensitivity labels of subjects and objects, association of an event with the identity of the user who triggered the event, all modifications to audit configuration and attempts to access audit log 225 files, all uses of authentication mechanisms, such as ssh, kerberos, and others, and changes to any trusted database (e.g., the password), among others. The audit system 224A receives system calls from privileged user-space applications, which communicate with the kernel through a netfilter socket to report any security related activity happening on the system such as logins, or changes of ID.

The Linux capabilities feature breaks up the privileges available to processes that run as the root user into smaller groups of privileges. This way a process running with root privilege can be limited to get only the minimal privileges it needs to operate. Containers are started with a default set of several privileges, and privileges of the default set can be manually removed or added to. Among these default privileges is the audit_write capability, which allows an application to write records to the audit log 225 of the audit system 224A. However, because audit_write is a privileged operation, there are inherent dangers with allowing an application in a container to use it. For example, the application in the container could write anything, including writing information into the audit log 225 that could compromise the trust relationship between the applications/processes on the host OS 221 and what is in the audit log 225. As a result of this, security of the host OS 221 may be enhanced by limiting the use of audit_write to host OS 221 applications, as opposed to allowing containers to use it. However, if the audit_write capability is restricted (e.g., using the Linux capabilities tool), then a container application attempting to access the audit system 224A would see all requests refused with e.g., an "operation not permitted" response.

However, containers that attempt to write to the audit log 225 may have important information that needs to be recorded, and thus the system 100 may provide a different location in which such information (also referred to herein as "audit information") that was originally intended to be written by application 116 (via container 114) to the audit log 225 may be written. FIG. 3A illustrates a substitute log 117, where audit information that application 116 intends to write to the audit log 225 can be rerouted to. The host OS 211 may define the substitute log 117 within container specific directories of the container 114, and may define the substitute log 117 so that it is associated with audit information (e.g., information regarding security events) that application 116 running within container 114 would normally write to the audit log 225. For example, if application 116 is an sshd server program running inside of the container 114, it may not know it is running in a container and so will generate the same audit information logs for the substitute audit log 117 that it would generate if running on the host. In this way, the container tooling may review the substitute audit log 225 as necessary on an ad-hoc basis.

A socket creates an endpoint for communication and returns a file descriptor that refers to that endpoint. A user process (e.g., application 116) may use various socket-layer functions to send or receive packets and to perform other socket operations. One such socket-layer function is the socketpair system call, which creates two connected anonymous sockets. The socketpair system call may return two socket file descriptors that represent the two endpoints of a single connection, such as e.g., a virtual connection. The sockets in the socket pair may be unprivileged in some cases. The host OS 221 may include a netfilter subsystem (not shown) that provides stateful or stateless packet filtering as well as network address translation (NAT) and internet protocol (IP) masquerading services. The netfilter subsystem may be implemented using the iptables administration tool, which is a rule-based tool for filtering packets. The netfilter subsystem may provide a netfilter socket that is privileged and acts as a uniform interface and provides a means of communication (e.g., an API between) between the container 114 (user space) and the kernel 224.

The kernel 224 may further include container management program 224B (hereinafter referred to as "management program 224B"), which may be any appropriate tool for building, managing and running containers and container images, such as Podman or Docker. As part of its container management functions, management program 224B may monitor for and detect certain system calls from the container 114. Thus, management program 224B may be configured to monitor for and detect system calls from the container 114 that attempt to write audit information to the kernel 224's audit log 225 by analyzing arguments of the system call that attempt to create a netfilter socket for communicating with the kernel 224. In some embodiments, in response to detecting such a system call, the management program 224B may intercept the system call and report an error to the application 116 which is similar to the error reported to the application 116 if the audit_write privilege is restricted entirely. In response to receiving this error report, application 116 may handle the restriction gracefully and refrain from attempting to access the audit log 225 again. For example, the container tools that use the audit log 225 may determine that the audit log 225 is no longer supported and refrain from attempting to access the audit log 225 again. This may be useful for applications that generate a lot of audit information output, so one reason to block the audit log 225 by reporting such an error to the application 116 could be to limit the amount of generated 10 from the container 114, or more generally whenever the audit log 225 is not needed/used.

In some embodiments, in response to detecting such a system call, the monitoring program 224B may create a socket pair (illustrated in FIG. 3B) that is a virtual connection between 2 endpoints as discussed herein. The management program 224B may connect a first socket 227 of this pair to the container 114 and monitor the second socket 226 of the pair. The kernel 224 may intercept the system call, and change its arguments to connect to the second socket 226 of the socket pair created by the management program 224B, which is an unprivileged socket of a different type than the netfilter socket the system call was initially attempting to utilize. In this way, the container 114 may operate as if it has connected to the actual audit log 225. Subsequently, the kernel 224 may extract the audit information meant to be written to the audit log 225 from the system call and write this audit information to the second socket 226 of the pair. The management program 224B may detect that the audit information has been written to the second socket 226 and may write the audit information to the substitute audit log 117.

In some embodiments, the kernel 224 may utilize the Secure Computing Mode (seccomp) feature of the kernel 224 to simplify the rerouting of the attempted system call to the second socket 226. The seccomp feature operates to filter system calls to the kernel 224 from a container. The rules regarding restricted and allowed calls may be arranged in profiles, and different profiles may be applied to different containers. By limiting the system calls that a container may make, Seccomp may provide more fine-grained control than Linux capabilities, and provides an attacker a limited number of system calls from the container, thereby reducing the potential attack surface. For example, a default seccomp profile may block 44 system calls out of more than 300 available. In some embodiments, a seccomp profile may comprise a JSON file (or any other appropriate file type) having a set of filtering rules. Seccomp uses the Berkeley Packet Filter (BPF) system, which is programmable on the fly so that a user can generate a custom seccomp profile to filter (e.g., restrict) certain system calls. In addition, seccomp may also limit or modify certain system calls by allowing for creation of custom rules (conditions) for how and/or when a system call should be limited/modified. A custom profile may be defined and provided to the kernel 224 (e.g., via the monitoring program 224B) which, upon detecting a restricted system call, may perform certain actions based on the rules of the custom seccomp profile.

Continuing to refer to the example of FIGS. 3A and 3B, a user may define a custom seccomp profile (not shown) and upon initiating the container 114, the management program 224B (e.g., Podman) may provide the custom seccomp profile to the kernel 224. The custom seccomp profile may provide rules for how the kernel 224 should handle system calls from the container 114 that attempt to access the audit log 225. For example, the custom seccomp profile may include a rule specifying that upon detecting a system call from container 114 that attempts to create a netfilter socket for writing audit information to the kernel 224's audit log 225, the system call should be intercepted and its arguments changed so that the system call connects to the second socket 226 of the socket pair, which is managed by the management program 224B. Thus, in response to detecting such a system call, the kernel 224 may intercept the system call, and change its arguments so that the system call connects to the second socket 226 of the socket pair. The kernel 224 may then extract and write the audit information of the system call to the second socket 226 of the socket pair. Upon detecting that audit information has been written to the second socket 226, management program 224B may write the audit information to the substitute log 117. In this way, the container tooling may review the substitute audit log 225 as necessary on an ad-hoc basis.

Figure 4:
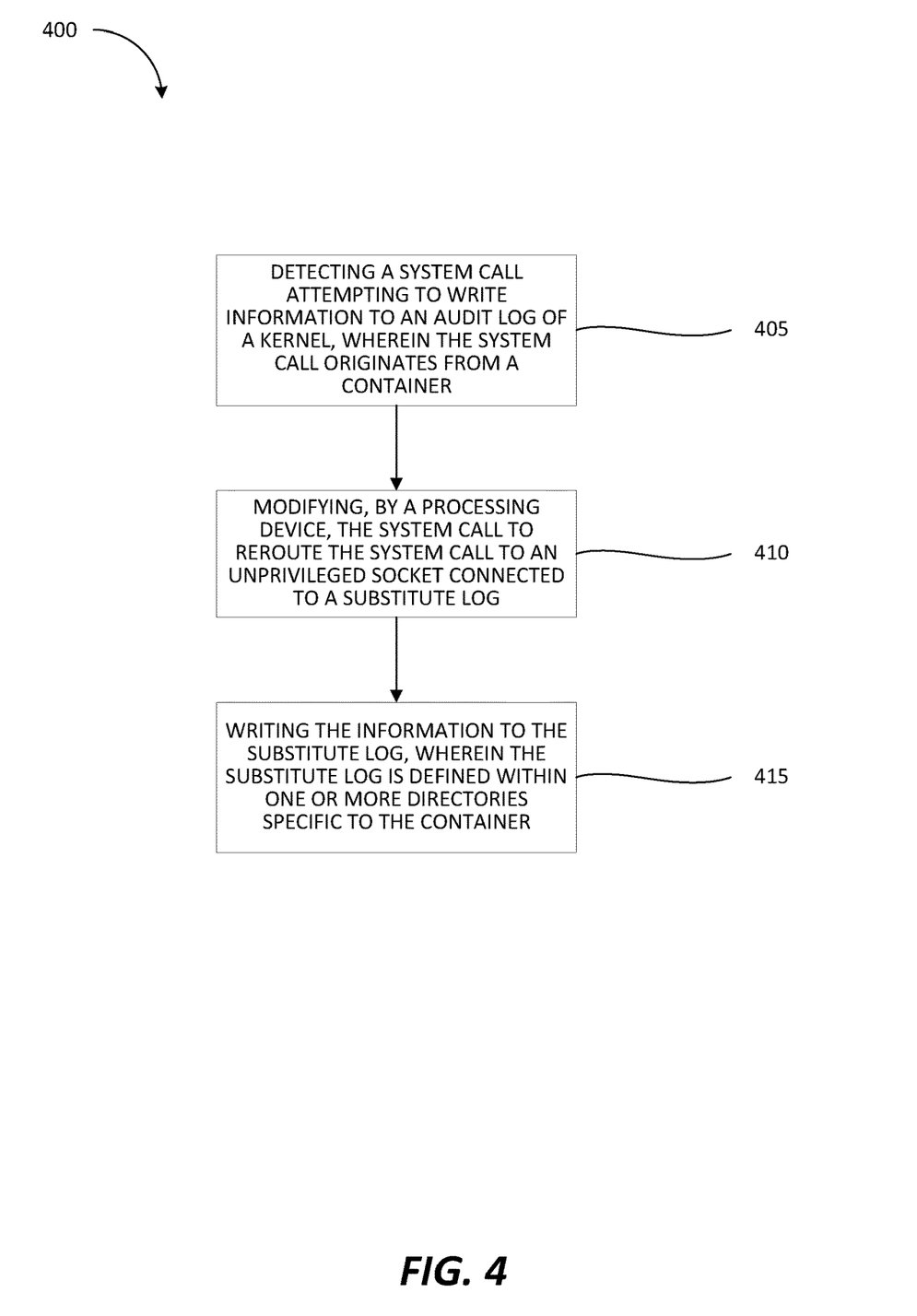
FIG. 4 is a flow diagram of a method of providing a substitute audit log for use by applications in the user-space of a host OS to write audit information, in accordance with some embodiments of the present disclosure.

FIG. 4 is a flow diagram of a method 400 of providing a substitute audit log for use by applications in the user-space of a host OS to write audit information, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., computing device 120 illustrated in FIG. 3A).

Referring simultaneously to FIG. 3A, the method 400 begins at block 405, where the kernel 224 may detect a system call from the container 114 that is attempting to write audit information to the kernel 224's audit log 225. The kernel 224 may perform this detection using a custom seccomp profile that provides rules for how/when certain system calls should be limited/modified. Upon receiving the system call, the kernel 224 may analyze the arguments of the system call and determine that the system call is attempting to create a netfilter socket for communicating with the kernel 224. At block 410, the kernel may intercept the system call and modify it to connect to an unprivileged socket. More specifically, the kernel 224 may change the arguments of the system call to connect to the second socket of a socket pair created by a management program 224B in response to detecting the system call. In this way, the container 114 may operate as if it has connected to the actual audit log 225. The second socket of the socket may be an unprivileged socket of a different type than the netfilter socket the system call was initially attempting to utilise. The kernel 224 may extract the audit information meant to be written to the audit log 225 from the system call and write this audit information to the second socket of the pair. At block 415, the management program 224B may detect that audit information has been written to the second socket and may write the audit information to the substitute audit log 117.

Figure 5:
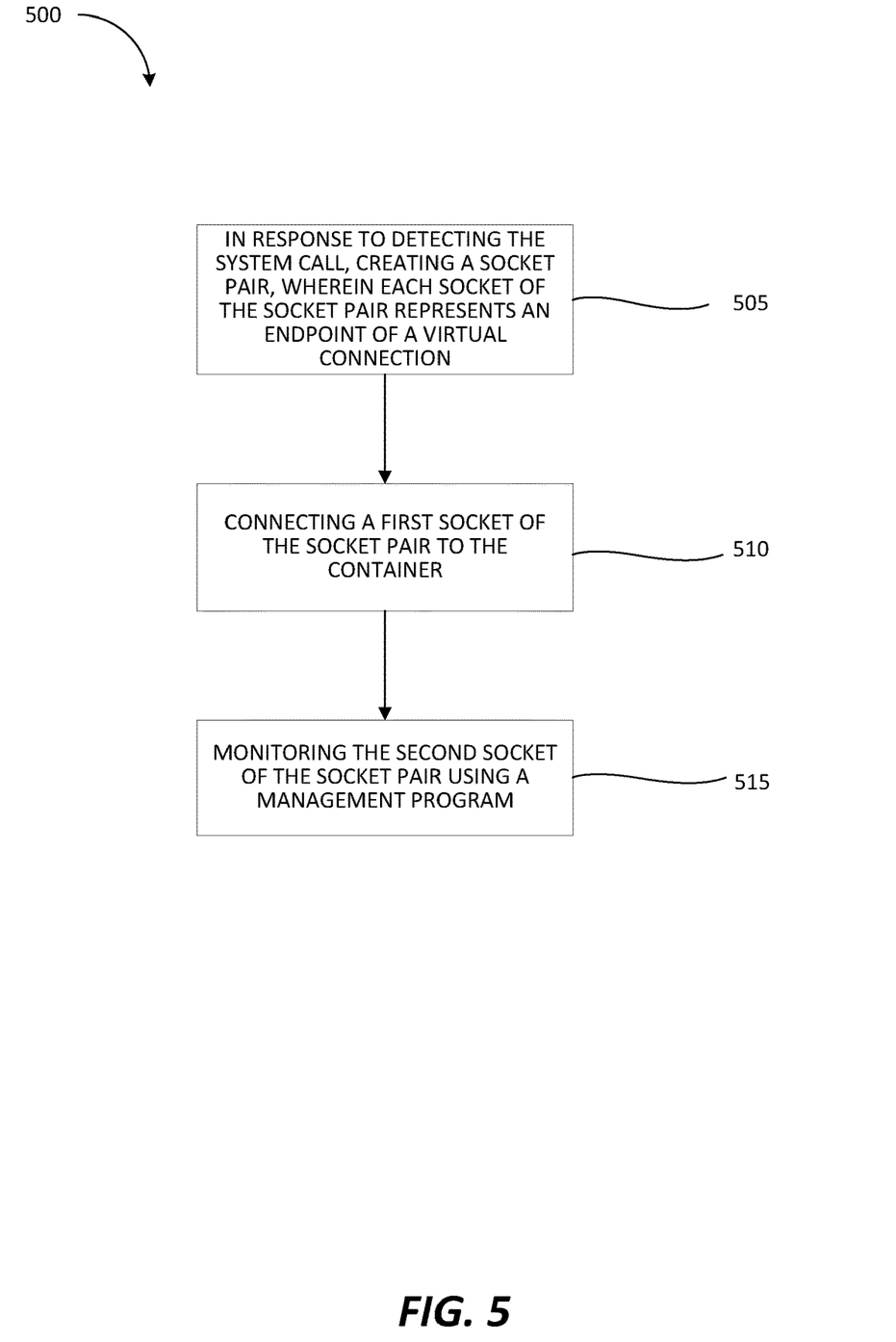
FIG. 5 is a flow diagram of a method of generating a connection to a substitute log, in accordance with some embodiments of the present disclosure.

FIG. 5 is a flow diagram of a method 500 of generating a connection to the substitute log, in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a computing device (e.g., computing device 120 illustrated in FIG. 3A).

Referring simultaneously to FIG. 3A, at block 505, in response to detecting a system call from the container 114 that is attempting to write audit information to the kernel 224's audit log 225, the monitoring program 224B may create a socket pair that is a virtual connection between 2 endpoints as discussed herein. At block 510, the management program 224B may connect a first socket of this pair to the container 114 and at block 515 may monitor the second socket of the pair.

Figure 6:
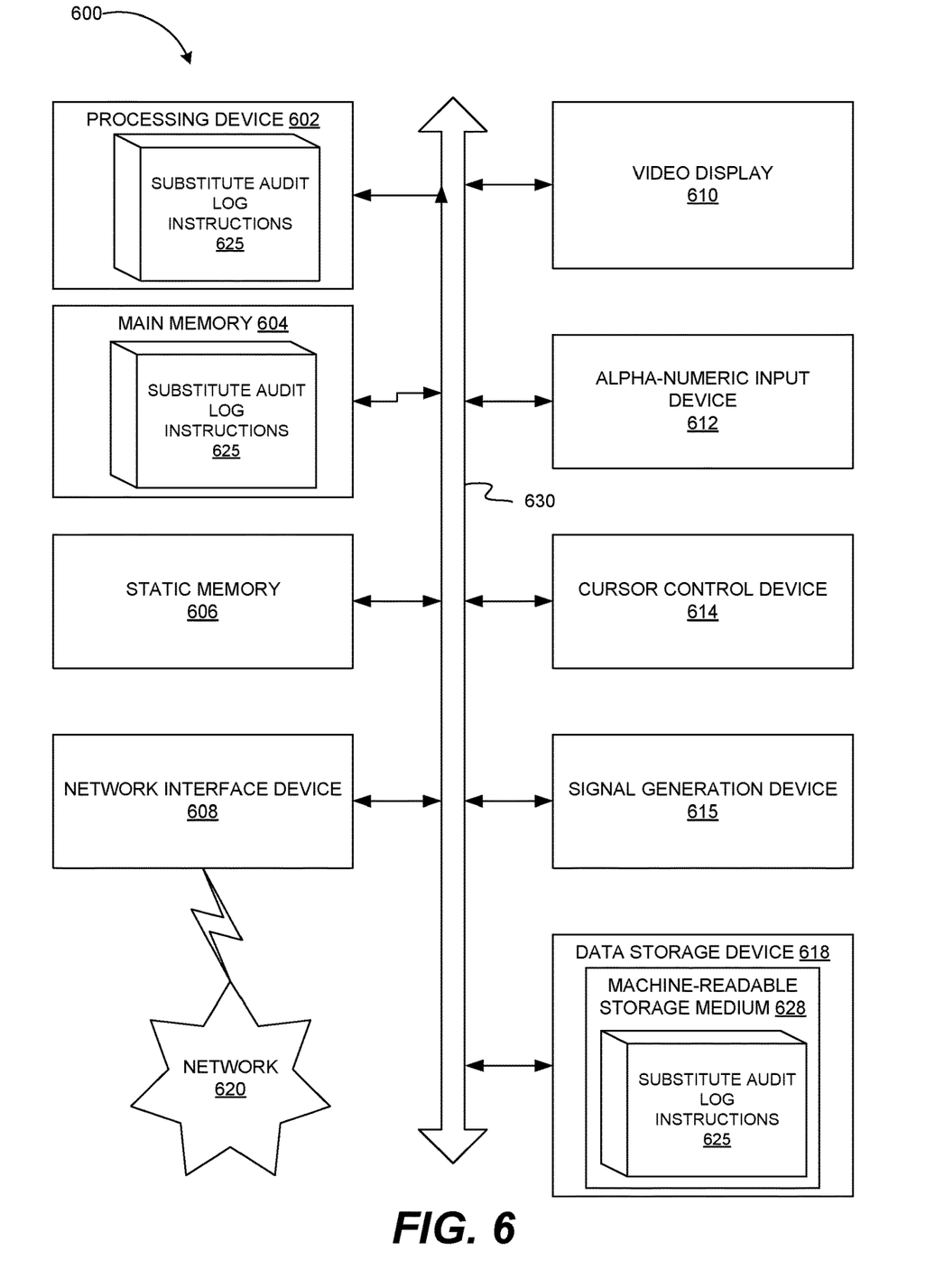
FIG. 6 is a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for providing a substitute audit log 225 for use by applications in the user-space of a host OS to write audit information. More specifically, the machine may detect a system call attempting to write audit information to an audit log 225 of a kernel, wherein the system call originates from a container, and modify the system call to reroute the system call to an unprivileged socket connected to a substitute log. The machine may subsequently write the audit information to the substitute log, wherein the substitute log is defined within one or more directories specific to the container.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute substitute audit log 225 instructions 625, for performing the operations and steps discussed herein.

The data storage device 618 may include a machine-readable storage medium 628, on which is stored one or more sets of substitute audit log 225 instructions 625 (e.g., software) embodying any one or more of the methodologies of functions described herein. The substitute audit log 225 instructions 625 may also reside, completely or at least partially, within the main memory 604 or within the processing device 602 during execution thereof by the computer system 600; the main memory 604 and the processing device 602 also constituting machine-readable storage media. The substitute audit log 225 instructions 625 may further be transmitted or received over a network 620 via the network interface device 608.

The machine-readable storage medium 628 may also be used to store instructions to provide substitute audit log 225 to user-space applications, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method comprising:
   detecting a system call attempting to write information to an audit log of a kernel, wherein the system call originates from a container;
   creating a socket pair in response to detecting the system call, wherein each socket of the socket pair represents an endpoint of a virtual connection and wherein a second socket of the socket pair is an unprivileged socket and is a different type of socket from a socket initially used by the system call when attempting to write the information to the audit log of a kernel;
   connecting a first socket of the socket pair to the container;
   modifying, by a processing device, the system call to reroute the system call to the second socket of the socket pair, wherein the second socket is connected to a substitute log that is to receive information intended for the audit log;
   writing the information to the second socket of the socket pair; and
   in response to detecting that the information has been written to the second socket of the socket pair, writing the information directly from the second socket to the substitute log, wherein the substitute log is defined within one or more directories specific to the container.

2. The method of claim 1, wherein detecting the system call comprises:
   determining that the system call is attempting to create a netfilter socket to communicate with the audit log of the kernel.

3. The method of claim 1, further comprising:
   defining a secure computing mode (seccomp) profile comprising a set of rules for filtering system calls from the container, wherein the set of rules comprises rules instructing the kernel to change arguments of the system call to connect the system call to the second socket of the socket pair; and
   providing the seccomp profile to the kernel.

4. The method of claim 3, wherein modifying the system call comprises:
   changing the arguments of the system call to connect the system call to the second socket of the socket pair based on the seccomp profile, wherein the container operates as if it is connected to the audit log of the kernel.

5. The method of claim 4, further comprising:
   monitoring the second socket of the socket pair using a management program, wherein the management program writes the information to the substitute log in response to detecting that the information has been written to the second socket of the socket pair.

6. The method of claim 1, wherein container tools access the information from the substitute log on an ad-hoc basis.

7. A system comprising:
   a memory; and a processing device operatively coupled to the memory, the processing device to:
  detect a system call attempting to write information to an audit log of a kernel, wherein the system call originates from a container;
  create a socket pair in response to detecting the system call, wherein each socket of the socket pair represents an endpoint of a virtual connection and wherein a second socket of the socket pair is an unprivileged socket and is a different type of socket from a socket initially used by the system call when attempting to write the information to the audit log of a kernel;
  connect a first socket of the socket pair to the container;
  modify the system call to reroute the system call to the second socket of the socket pair, wherein the second socket is connected to a substitute log that is to receive information intended for the audit log;
  write the information to the second socket of the socket pair; and
  in response to detecting that the information has been written to the second socket of the socket pair, write the information directly from the second socket to the substitute log, wherein the substitute log is defined within one or more directories specific to the container.

8. The system of claim 7, wherein to detect the system call, the processing device is to:
  determine that the system call is attempting to create a netfilter socket to communicate with the audit log of the kernel.

9. The system of claim 7, wherein the processing device is further to:
  define a secure computing mode (seccomp) profile comprising a set of rules for filtering system calls from the container, wherein the set of rules comprises rules instructing the kernel to change arguments of the system call to connect the system call to the second socket of the socket pair; and
  provide the seccomp profile to the kernel.

10. The system of claim 9, wherein to modify the system call, the processing device is to:
  change, using the kernel, the arguments of the system call to connect the system call to the second socket of the socket pair based on the seccomp profile, wherein the container operates as if it is connected to the audit log of the kernel.

11. The system of claim 10, wherein the processing device is further to:
  monitor the second socket of the socket pair using a management program, wherein the management program writes the information to the substitute log in response to detecting that the information has been written to the second socket of the socket pair.

12. The system of claim 7, wherein container tools access the information from the substitute log on an ad-hoc basis.

13. A non-transitory computer-readable medium having instructions stored thereon which, when executed by a processing device, cause the processing device to:
  detect a system call attempting to write information to an audit log of a kernel, wherein the system call originates from a container;
  create a socket pair in response to detecting the system call, wherein each socket of the socket pair represents an endpoint of a virtual connection and wherein a second socket of the socket pair is an unprivileged socket and is a different type of socket from a socket initially used by the system call when attempting to write the information to the audit log of a kernel;
  connect a first socket of the socket pair to the container;
  modify, by the processing device, the system call to reroute the system call to the second socket of the socket pair, wherein the second socket is connected to a substitute log that is to receive information intended for the audit log;
  writing the information to the second socket of the socket pair; and
  in response to detecting that the information has been written to the second socket of the socket pair, write the information directly from the second socket to the substitute log, wherein the substitute log is defined within one or more directories specific to the container.

14. The non-transitory computer-readable medium of claim 13, wherein to detect the system call, the processing device is to:
  determine that the system call is attempting to create a netfilter socket to communicate with the audit log of the kernel.

15. The non-transitory computer-readable medium of claim 13, wherein the processing device is further to:
  define a secure computing mode (seccomp) profile comprising a set of rules for filtering system calls from the container, wherein the set of rules comprises rules instructing the kernel to change arguments of the system call to connect the system call to the second socket of the socket pair; and
  provide the seccomp profile to the kernel.

16. The non-transitory computer-readable medium of claim 15, wherein to modify the system call, the processing device is to:
  change, using the kernel, the arguments of the system call to connect the system call to the second socket of the socket pair based on the seccomp profile, wherein the container operates as if it is connected to the audit log of the kernel.

17. The system of claim 16, wherein the processing device is further to:
  monitor the second socket of the socket pair using a management program, wherein the management program writes the information to the substitute log in response to detecting that the information has been written to the second socket of the socket pair.

* * * * *